April 21, 1959     P. M. STIVENDER     2,882,687
CLOSED CIRCUIT TURBINES
Filed Dec. 30, 1957
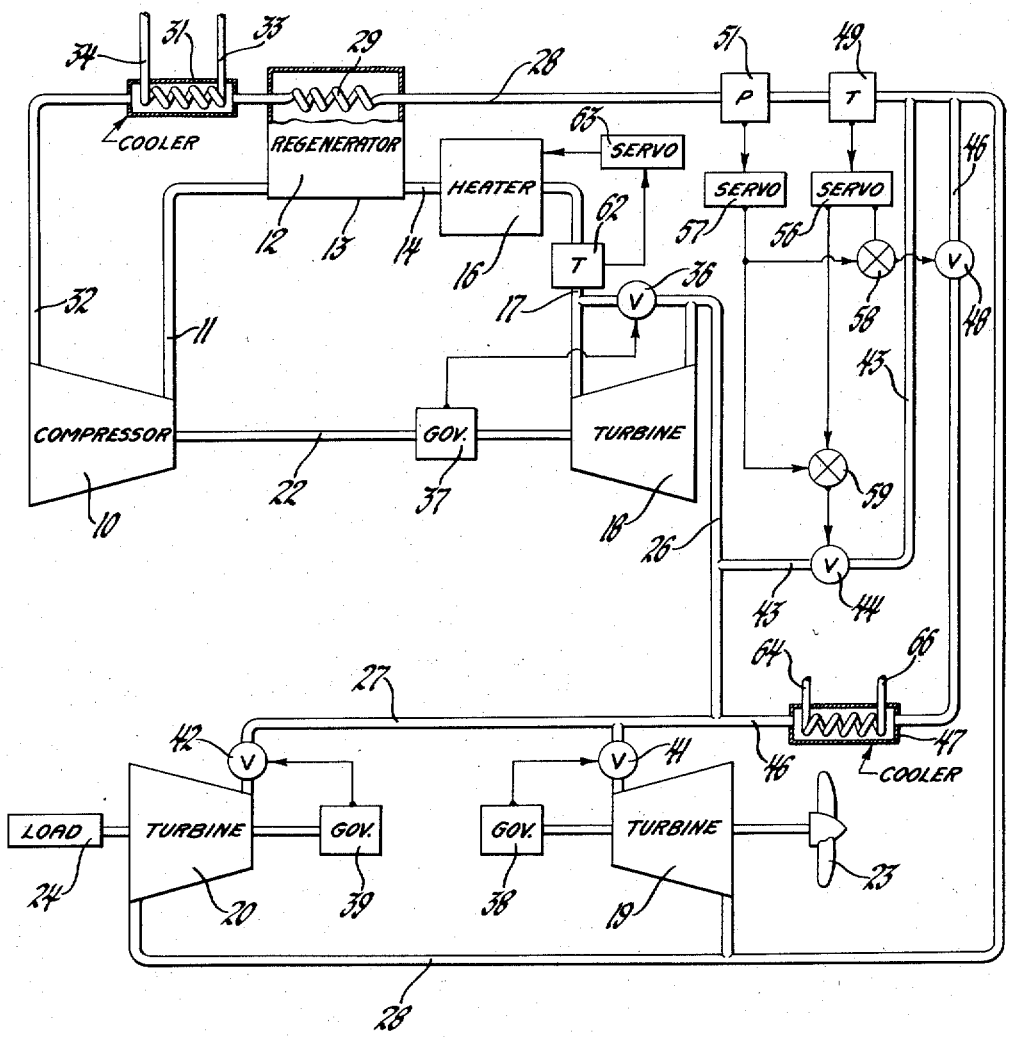
INVENTOR.
Paul M. Stivender
BY Paul Fitzpatrick
ATTORNEY

United States Patent Office 2,882,687
Patented Apr. 21, 1959

2,882,687

CLOSED CIRCUIT TURBINES

Paul M. Stivender, South Euclid, Ohio, assignor to General Motors Corporation, Detroit, Mich., a corporation of Delaware Application December 30, 1957, Serial No. 706,123

5 Claims. (Cl. 60—59)

My invention relates to control of gas turbine systems, particularly those of the closed circuit type. In closed circuit gas turbine power plants it is highly desirable to maintain predetermined pressure and temperature levels in the system to promote constant operation and prevent thermal shock to the components. The principal object of the invention is to improve the controls and thereby the reliability and durability of closed circuit turbine power plants.

The nature of the invention and the advantages thereof will be apparent to those skilled in the art from the succeeding description of the preferred embodiment of the invention and the accompanying drawing, which is a schematic diagram of a power plant embodying the invention.

Referring to the drawing, the power plant comprises a compressor 10 the outlet of which is connected by pipe 11 to one pass 12 of a regenerator 13. The regenerator is connected through conduit 14 to a heater 16 which is in turn connected through conduit 17 and other conduits to be described to turbine means comprising, as illustrated, turbines 18, 19, and 20. Turbine 18 is a compressor driving turbine connected to the compressor 10 by a shaft 22. Turbines 19 and 20 are power output turbines. A ship propulsion power plant is illustrated, turbine 19 driving a ship's propeller 23 and turbine 20 driving a load 24 which might be an electric generator for ship's service.

Turbine 18 is a high pressure turbine the outlet of which is connected through conduit 26 to a conduit 27 supplying low pressure turbines 19 and 20 in parallel. The outlets of the low pressure turbines are connected through conduit 28 to the second pass 29 of regenerator 13 and through a cooler 31 to the inlet conduit 32 of the compressor. The cooler is supplied with a cooling medium such as water through supply and return conduits 33 and 34. Turbine 18 is controlled by a bypass valve 36 connected between the inlet and outlet of the turbine controlled by governor 37 which operates the valve to hold the turbine 18 at the governor speed setting. Turbines 19 and 20 are controlled by governors 38 and 39 connected to throttling valves 41 and 42, respectively, in series with these turbines.

In normal steady state operation of the power plant, the entire output of the high pressure turbine in conduit 26 is fed through the low pressure turbines. However, if the load on the auxiliary turbine 20 decreases or the output of turbine 19 is decreased in maneuvering the ship, and valve 42 or 41 moves in a closing direction, the low pressure turbines must be bypassed. Two low pressure turbine bypass conduits are provided, a first bypass conduit 43 in which is a regulatable throttling valve 44 and a second bypass conduit 46 in which are connected a second cooler 47 and a regulatable throttling valve 48. Conduits 43 and 46 connect to the low pressure turbine outlet conduit 28.

The invention relates principally to controls by which the pressure and temperature in the return conduit 28 downstream of the bypasses 43 and 46 are maintained constant at the desired predetermined levels. For this purpose, a suitable temperature-responsive device 49 and a suitable pressure-responsive device 51 are connected in or to the conduit 28. These devices measure the temperature and pressure of the combined motive fluid stream from the low pressure turbine exhausts and the low pressure turbine bypass conduits. The pressure and temperature-responsive devices 51 and 49 are both operatively connected to both bypass valves 44 and 48. The pressure-responsive device is connected in such a way as to close both valves concurrently when the pressure increases above the desired regulating point or open both when the pressure falls below the desired value. The temperature-responsive device is connected to both bypass valves so as to operate them in opposite senses or directions. If the temperature is above the set level, the temperature control operates to close valve 44 and open valve 48 so as to divert more of the bypassed gas through the cooler 47. If the temperature is below the set value, valve 44 is opened and valve 48 is closed.

This is accomplished by a suitable differential mechanism which may be mechanical differential gears or any other device which may serve to add and subtract the inputs or control signals from the responsive devices to the valves.

As illustrated, a servomechanism 56 provides a power output in response to the temperature error signal from responsive device 49 and a servomechanism 57 provides a power output in response to the error signal output of pressure-responsive device 51. Servomechanism 56 has outputs connected to differentials 58 and 59, respectively, and servomechanism 57 likewise has outputs connected as inputs to these differentials. Differential 59 serves to add the two signals. Thus, valve 44 driven by the output of differential 59 is moved in a closing direction if either pressure or temperature measured is too high. Differential 58 is connected as a subtracting differential with the output connected to valve 48. Differential 58 drives valve 48 in an opening direction in response to excess temperature and in a closing direction in response to excess pressure.

By maintaining constant pressure and temperature in the regenerator input, the compressor and regenerator are held in a constant temperature condition and the output from the regenerator to the heater through line 14 is maintained at constant temperature. The heater 16 may be controlled by a temperature-responsive device 62 connected in heater output line 17 actuating a suitable servomechanism 63 to control the energy output of the heater.

The heater may be of any suitable type. If it is a fuel fired heater, servo 63 may control the fuel supply. If the heater is of a nuclear reactor type, the servo 63 may operate appropriate controls to vary the energy level of the reactor.

Cooler 47 may be supplied with cooling water through supply line 64 and exhaust line 66. The cooling water may be constantly circulated by a suitable pump, not shown. Cooler 47 should be of sufficient capacity to absorb as much heat as the turbines 19 and 20 are capable of absorbing, so that if both turbines are shut down, the temperature in the return conduit to the regenerator may be kept at the same level as when the low pressure turbines are operating under full load. Of course, if the low pressure turbines are shut down for any length of time, the general energy level of the system may be reduced.

Certain standard auxiliaries to the power plant, such as a starter motor for the compressor turbine and means for adding and subtracting fluid in the motive circuit, are not shown in the interest of simplicity of the drawing.

It will be understood that the temperature controls 49 and 62 and pressure control 51 as well as governors 37, 38, and 39 may include means for setting in desired values or control point settings to adjust the operation of the system. The governor operated valves 41 and 42 may be used as shutoff valves for the low pressure turbines, or additional manually operated valves may be provided if desired.

It will be apparent to those skilled in the art that the bypass control of the invention is particularly adapted to maintain stable operating conditions in the power circuit and to avoid thermal shock to the regenerator and heater. The control is simple and involves no unusual equipment. Many conventional pressure and temperature measuring devices and conventional servomechanisms may be employed with standard power operated valves to provide the bypass control.

The detailed description of the invention for the purpose of explaining the principles thereof is not to be construed as limiting the invention, as many modifications within the scope of the invention may be made by the exercise of skill in the art.

I claim:

1. A closed circuit gas turbine power plant comprising, in combination, a compressor, one pass of a regenerator, a heater, turbine means, a second pass of the regenerator, and a first cooler connected in a closed circuit, first and second bypass conduits bypassing at least part of the turbine means, a second cooler connected in the second bypass conduit, a pressure-responsive means and a temperature-responsive means connected to the circuit downstream from the bypass conduits, means actuated by the pressure-responsive means for reducing flow through both bypass conduits in response to rise of pressure above a predetermined level, and means actuated by the temperature-responsive means for reducing flow through the first bypass conduit and increasing flow through the second bypass conduit in response to rise of temperature above a predetermined level.

2. A closed circuit gas turbine power plant comprising, in combination, a compressor, one pass of a regenerator, a heater, turbine means, a second pass of the regenerator, and a first cooler connected in a closed circuit, first and second bypass conduits bypassing at least part of the turbine means, a regulatable valve in each said bypass conduit, a second cooler connected in the second bypass conduit, a pressure-responsive means and a temperature-responsive means connected to the circuit downstream from the bypass conduits, means connecting both said valves to both said responsive means for regulation thereby, the pressure-responsive means being connected to the valves so as to operate the valves in the same direction to maintain a predetermined pressure level at the pressure-responsive means, and the temperature-responsive means being connected to the valves so as to operate the valves in opposite directions to maintain a predetermined temperature level at the temperature-responsive means.

3. A closed circuit gas turbine power plant comprising, in combination, a compressor, one pass of a regenerator, a heater, turbine means, a second pass of the regenerator, and a first cooler connected in a closed circuit, first and second bypass conduits bypassing at least part of the turbine means, a regulatable valve in each said bypass conduit, a second cooler connected in the second bypass conduit, a pressure-responsive means and a temperature-responsive means connected to the circuit downstream from the bypass conduits, differential means connecting both said valves to both said responsive means for regulation thereby, the pressure-responsive means being connected to the valves so as to operate the valves in the same direction to maintain a predetermined pressure level at the pressure-responsive means, and the temperature-responsive means being connected to the valves so as to operate the valves in opposite directions to maintain a predetermined temperature level at the temperature-responsive means.

4. A closed circuit gas turbine power plant comprising, in combination, a compressor, one pass of a regenerator, a heater, turbine means, a second pass of the regenerator, and a first cooler connected in a closed circuit, first and second bypass conduits bypassing at least part of the turbine means, a regulatable valve in each said bypass conduit, a second cooler connected in the second bypass conduit, a pressure-responsive means and a temperature-responsive means connected to the circuit downstream from the bypass conduits and ahead of the second regenerator pass, means connecting both said valves to both said responsive means for regulation thereby, the pressure-responsive means being connected to the valves so as to operate the valves in the same direction to maintain a predetermined pressure level at the pressure-responsive means, and the temperature-responsive means being connected to the valves so as to operate the valves in opposite directions to maintain a predetermined temperature level at the temperature-responsive means.

5. A closed circuit gas turbine power plant comprising, in combination, a compressor, one pass of a regenerator, a heater, a turbine connected to drive the compressor, a power output turbine, a second pass of the regenerator, and a first cooler connected in a closed circuit, first and second bypass conduits bypassing the power output turbine, a regulatable valve in each said bypass conduit, a second cooler connected in the second bypass conduit, a pressure-responsive means and a temperature-responsive means connected to the circuit downstream from the bypass conduits, means connecting both said valves to both said responsive means for regulation thereby, the pressure-responsive means being connected to the valves so as to operate the valves in the same direction to maintain a predetermined pressure level at the pressure-responsive means, and the temperature-responsive means being connected to the valves so as to operate the valves in opposite directions to maintain a predetermined temperature level at the temperature-responsive means.

No references cited.